United States Patent [19]

Park

[11] Patent Number: 5,701,984
[45] Date of Patent: Dec. 30, 1997

[54] SYNCHRONIZER FOR AUTOMOBILE TRANSMISSION

[75] Inventor: Dong-suk Park, Seoul, Rep. of Korea

[73] Assignee: Korea Spicer Corp., Inchon, Rep. of Korea

[21] Appl. No.: 662,925

[22] Filed: Jun. 13, 1996

[51] Int. Cl.[6] .................................... F16D 23/06
[52] U.S. Cl. ........................... 192/53.35; 192/53.36; 192/107 M; 74/339
[58] Field of Search ..................... 192/53.1, 53.3, 192/53.33, 53.35, 53.36, 107 M; 74/339

[56] References Cited

U.S. PATENT DOCUMENTS

| | | | |
|---|---|---|---|
| 1,997,056 | 4/1935 | Griswold | 192/53.35 |
| 3,175,412 | 3/1965 | Peras | 192/53.36 X |
| 3,795,293 | 3/1974 | Worner | 192/53.35 |
| 5,349,661 | 9/1994 | Kawamura et al. | 192/107 M |

*Primary Examiner*—Richard M. Lorence
*Attorney, Agent, or Firm*—John A. Parrish; Maria Parrish Tungol

[57] ABSTRACT

The present invention relates to a synchronizer for automobile transmissions. The invention provides a synchronizer in which the stroke of the shift lever is shorter for the same synchronizing time and the shift lever is operated by a smaller operating force to give convenient operation. By forming a friction surface at the outer circumference of the sleeve, the friction is located at the farthest position from the center line of the synchronizer so that the friction force is increased. At the same time, the pitch circle diameter of the power transmission spline is the largest so that the width of the synchronizer is reduced and the time required for synchronizing reduced. Also, the torque required in operating and the operating stroke are reduced remarkably whereby the enhanced performance synchronizer for automobile transmission provided.

4 Claims, 6 Drawing Sheets

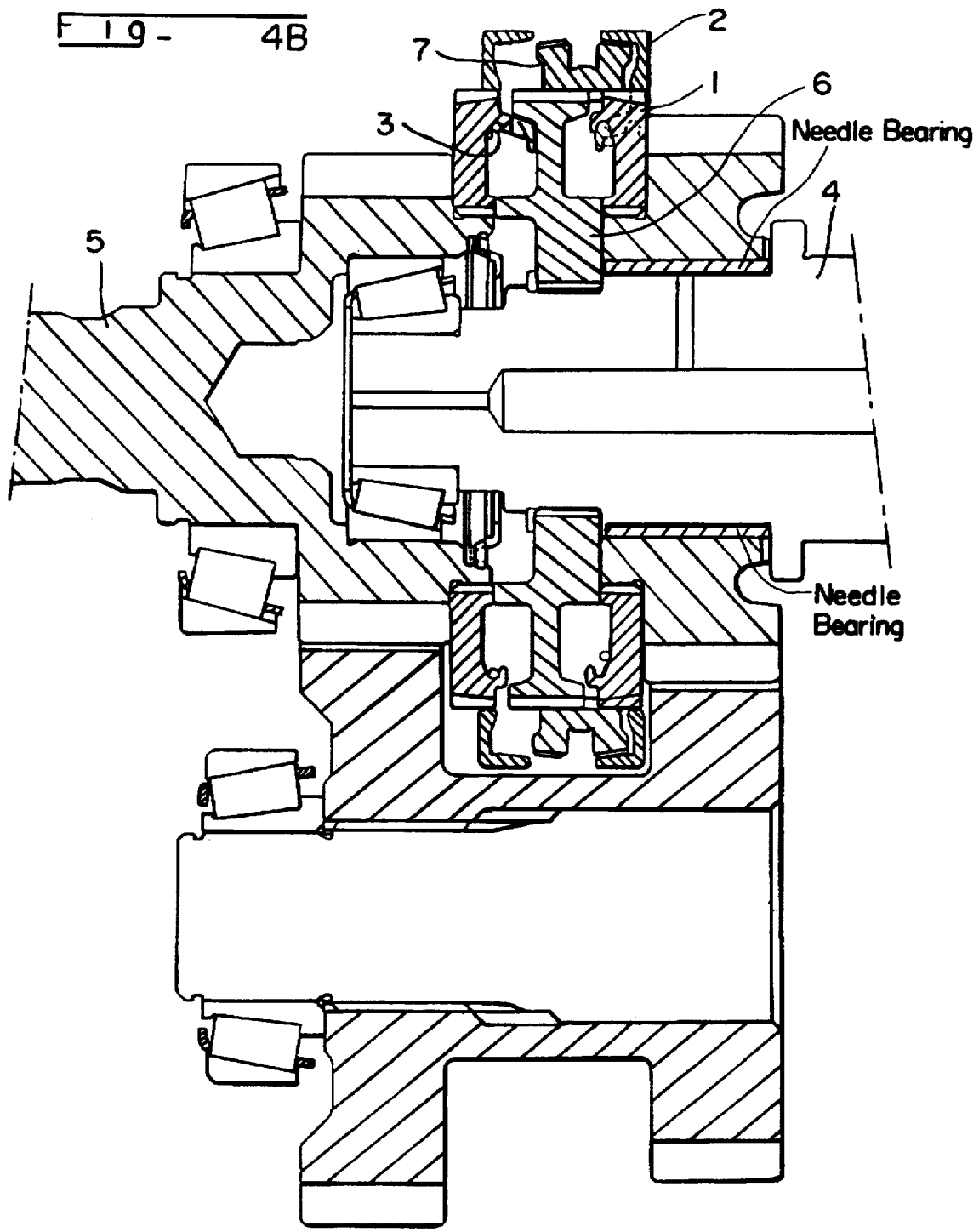

SYNCHRONIZER FOR AUTOMOBILE TRANSMISSION

FIELD OF THE INVENTION

The present invention relates to a synchronizer applied to the transmission for automobile.

As is known, in an automobile transmission, in order to remove a rotating speed difference between a synchronizer hub and a dog clutch at shifting gear and achieve a smooth engagement thereof, when a frictional torque is produced therebetween, the rotational speed difference does not exist, and thereafter power transmission is made through a sleeve slided by a fork.

The types of known synchronizers used to provide the above synchronizing operation are the key type and the pin type synchronizers.

At first, FIG. 1 shows a key type synchronizer.

As shown in FIG. 1, a known key type synchronizer includes an insert key located under a sleeve in which the spline engages the outer circumference of the synchronizer hub, and a block ring is operated with the insert key and a dog clutch attached at a gear. During operation of the shift lever for the transmission, the block ring frictionally contacts the dog clutch so that frictional torque is produced therebetween and their rotations are coincided with each other. Therefore, synchronizing performance is obtained.

In this known key type synchronizer, and relative to the center line thereof, the frictional surface is located at a lower position than the spline of the dog clutch so that the frictional torque of this type synchronizer is remarkably smaller than that of a pin type synchronizer having the same radius.

Also, the known key type synchronizer has the block ring operated with the insert key located under the space of its hub relative to the center line thereof so its width is smaller than that of the pin type synchronizer. However, the frictional surface of the block ring is located at a lower position than the lower space of the outer circumference spline so that there is the drawback that less frictional torque is produced. Furthermore, this known key type synchronizer uses an additional block ring so that there is the additional drawback that the manufacturing cost is high.

In FIG. 2 shows a known pin type synchronizer.

As shown in FIG. 2, a known pin type synchronizer has a through hole at a sleeve in which a spline engages a synchronizer hub, and a pin is inserted into the through hole and an inner ring formed at both ends of the pin. During operation, a fork operated by a shift lever, and the sleeve is moved so that the inner ring located at both ends of the pin frictionally contacts the inner wall of the outer ring so that friction is produced and their rotations become coincident with each other. Thereafter, the sleeve is connected with the dog clutch and the synchronizer hub so that power transmission is achieved.

The known pin type synchronizer needs an additional space for the inner ring and outer ring at both ends of the pin so that the width of this type of synchronizer is wide. Also, since the pin type synchronizer uses the inner ring and pin as additional parts requiring additional manufacturing processes, for example a riveting process, is needed to secure the inner ring at both ends of the pin thus resulting in higher manufacturing cost.

The pin type synchronizer also needs means for transferring driving force to move the sleeve, and means for transferring frictional force to connect with the outer ring and the gear in the rotating direction. Because the spline of the sleeve is located at a lower position than the pin in the rotating radial direction, and because the pitch circle diameter of spline is small, then the engaging length of the spline must be long to transfer the same engine power as the key type synchronizer.

Therefore, the pin type synchronizer needs not only an additional space for the inner ring and the outer ring at both ends of the pin, but also means for transferring a driving force and a frictional force. Also, the engaged length of the spline of the sleeve is longer. This is another drawback because the frictional force is higher than the key type and its width is larger.

Also, as the engaging length of the spline increases the operating length of the synchronizer increases by the same amount. Therefore, for the same friction force synchronizer, there is a drawback that the stroke and the operating force to move the shift lever is larger.

SUMMARY OF THE INVENTION

The invention provides a synchronizer in which the stroke of the shift lever is short for the same synchronizing time, and in which the shift lever is operated by a small operating force to convenient operation.

The invention also provides an improved synchronizer in which a friction surface is formed at the outer circumference of sleeve to locate the friction surface at the farthest position from the center line of the synchronizer so that the friction force is remarkably increased and at the same time, the pitch circle diameter of the power transmission spline is the largest. As a result, the width of synchronizer is reduced and the synchronizing time required, the operating force and the operating stroke are reduced remarkably.

BRIEF DESCRIPTION OF THE DRAWINGS

The present invention is described as follows in reference with the attached drawings.

FIG. 4 shows the operational state of the synchronizer in accordance with the present invention; FIG. 4(B) is a longitudinal sectional drawing showing the shifting state made by the shift lever.

DETAILED DESCRIPTION OF THE INVENTION

Figure 1:
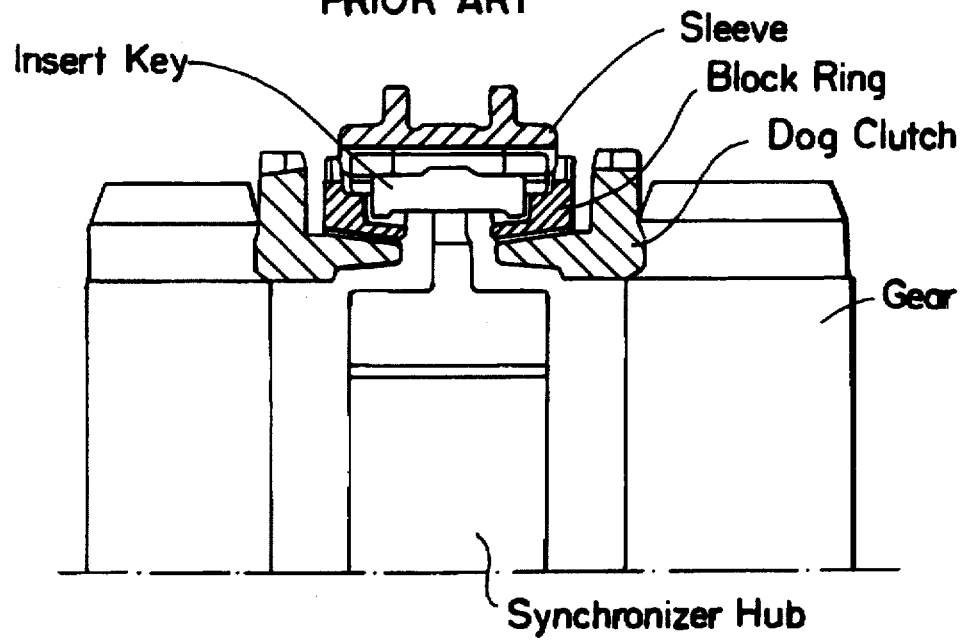
FIG. 1 shows the important portion of the prior key type synchronizer.
Figure 2:
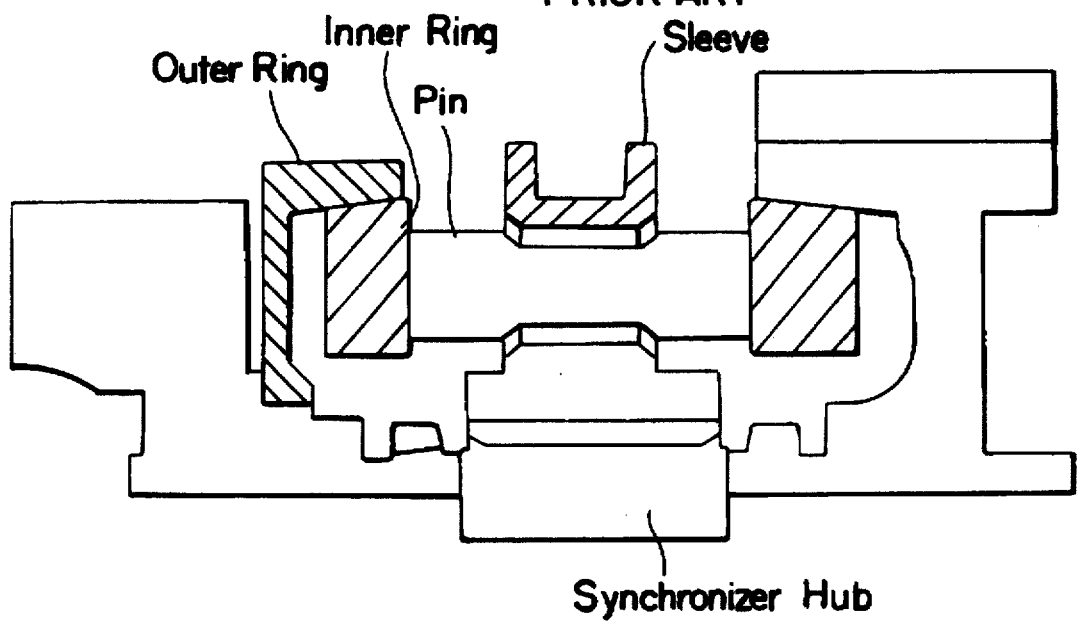
FIG. 2 shows the important portion of the prior pin type synchronizer.
Figure 3:
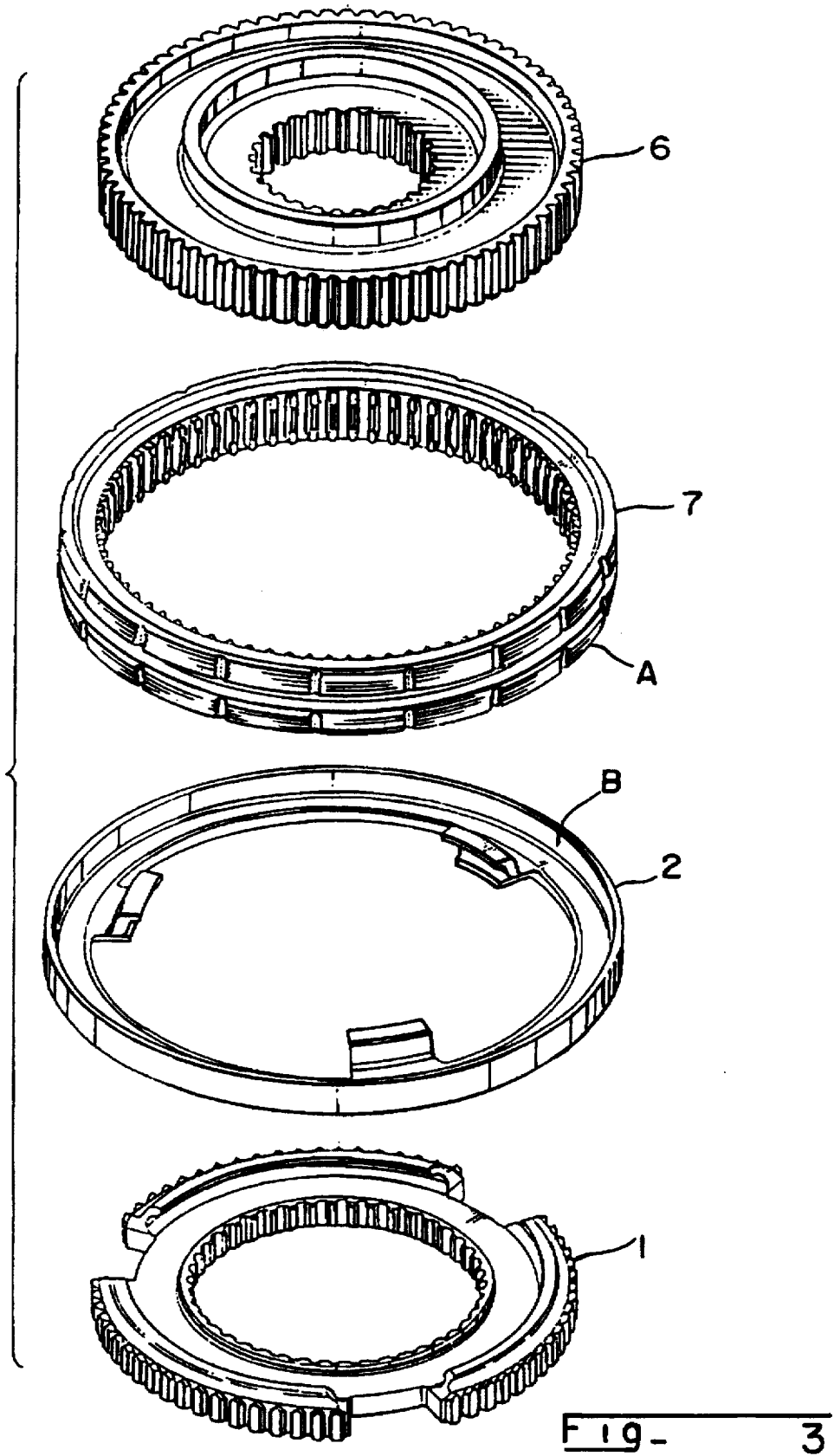
FIG. 3 is an exploded perspective drawing showing the assembly of the synchronizer in accordance with the present invention.

In FIG. 3, a synchronizer of the present invention for an automobile transmission is shown as an exploded perspective drawing.

In this figure are shown a synchronizer hub(6) inserted into an output shaft(4) by a spline engagement, a sleeve(7) inserted into the outer circumference of synchronizer hub (6), an outer ring(2) and a dog clutch(1) engaged with outer ring (2).

On engagement of dog clutch(1) is rotated by a mutually rotating gear on the shaft concentric with input shaft(5) and outer ring(2) is inserted into dog clutch(1). Loop spring(3) is inserted between dog clutch (1) and outer ring (2), and loop spring(3) is moved with outer ring(2). Synchronizer hub(6) engages output shaft(4) by a spline so that they rotate at the same rotating speed. Sleeve(7) engages the outer circumference of synchronizer hub(6) so it rotates with synchronizer hub(6) at the same rotating speed. At the outer circumference of sleeve (7), friction surface(A) is formed so that sleeve(7) slides during shifting. Also, at the inner surface of outer ring(2), mutual friction surface(B) and friction surface (A) of sleeve (7) and mutual friction surface (B) have the same sloped angle.

Figure 4A:
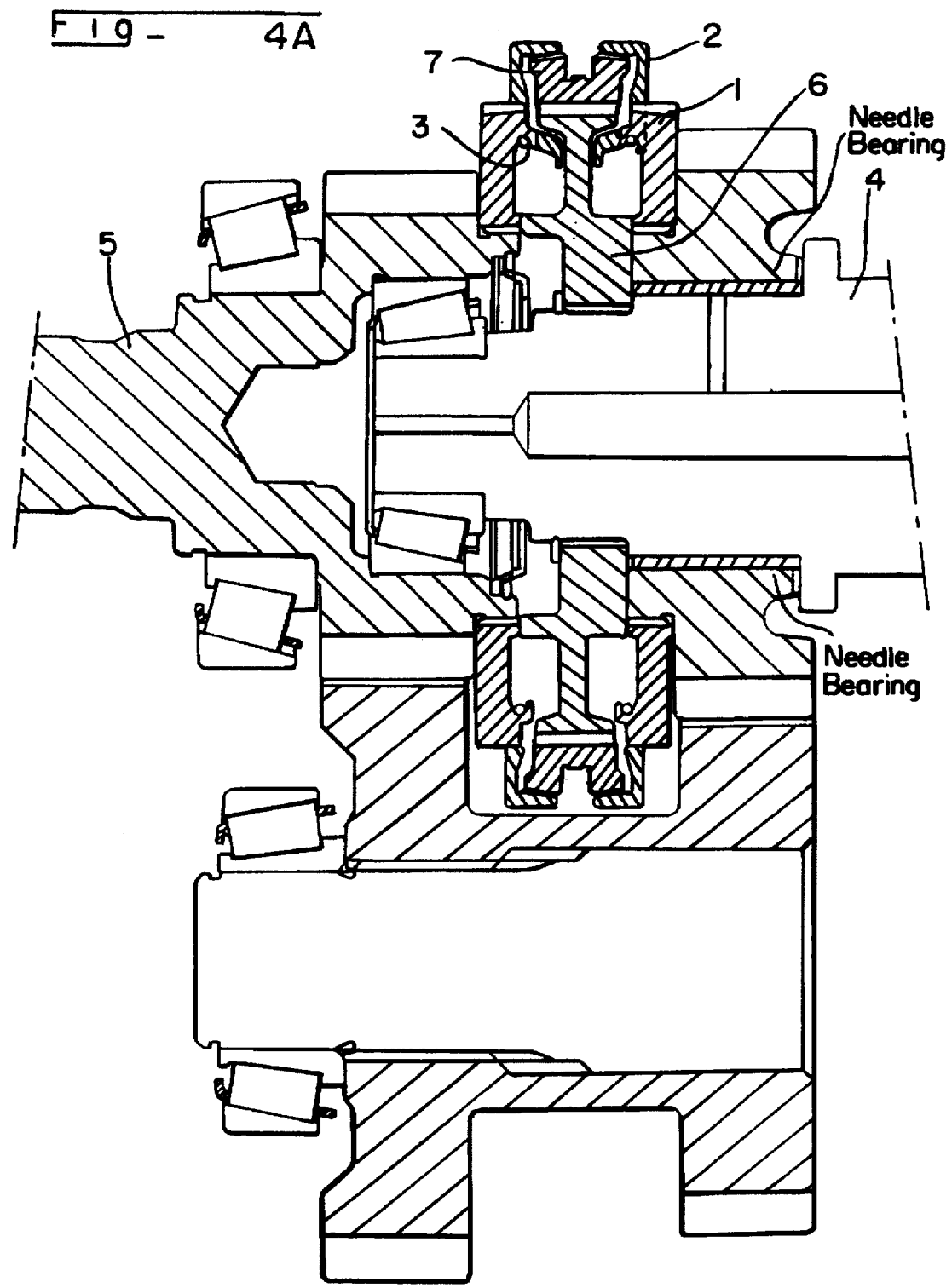
FIG. 4(A) is a longitudinal sectional drawing showing the neutral position of the shift lever.

In the present invention, power produced from an engine is transferred into a speed gear idling at a different speed relative to with the output shaft(4) through the input shaft(5) and sub shaft. Each speed gear idling on output shaft(4) lies on a needle bearing so that they rotate in accordance with each gear ratio without relation to the rotating speed of output shaft(4). This state is shown in FIG. 4(A).

During gear shifting, the inner spline of sleeve(7) is moved by a shift lever and engages the outer spline of dog clutch(1) and the spline formed at the outer circumference of synchronizer hub(6) so that gear power selected by the driver of the automobile is transferred into output shaft(4). Because the rotating speeds of sleeve(7) and dog clutch(1) are different from each other, it is necessary that rotational speed differences of sleeve(7) and dog clutch(1) is "O" in order to obtain smooth shifting. Therefore, to do this, sleeve(7) is moved into outer ring(2)

When sleeve(7) moves on one side, friction surface(A) formed at its outer circumference contacts the inner circumference of outer ring(2) to cause a mutual reactive force in the shaft direction. The reactive force produces an initial synchronizing frictional force between dog clutch(1) and sleeve(7) by the resilient force of loop spring(3) when engaging outer ring(2) with dog clutch(1).

In this way, the active and reactive force are produced at dog clutch(1) and outer ring(2) in the rotating direction by the initial synchronizing force so that there is contact between sleeve(7), dog clutch( 1 ) and outer ring(2)

These contacts induce a blocking to prevent the spline of sleeve(7) from advancing into the spline of dog clutch(1) until the mutual speed of outer ring(2) is "O" so that perfect synchronizing is made. After synchronizing is made, the spline engagement of sleeve(7) and dog clutch(1) is done.

As mentioned above, when the rotating speeds of sleeve (7) and dog clutch(1) are the same relative to each other, the spline of the inner circumference of sleeve(7) is engaged by the spline of the outer circumference of synchronizer hub(6) and the spline of the outer circumference of dog clutch(1) so that power transmission is done and shifting is ended. This state is shown in FIG. 4(B).

Figure 5A:
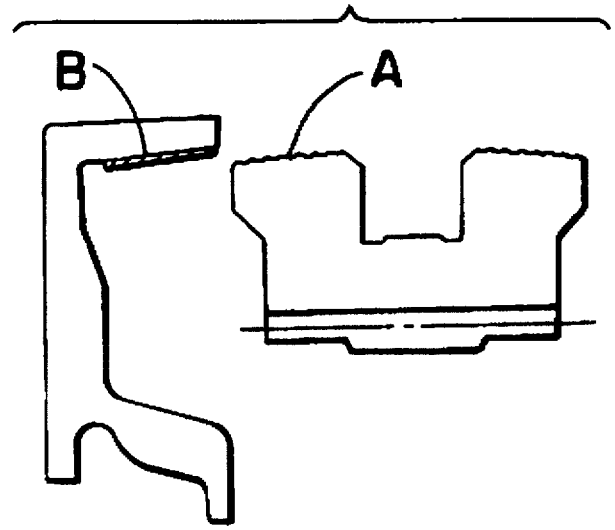
FIG. 5(A) is a longitudinal sectional drawing of one embodiment in which multiple grooves are formed at a frictional surface(A) and a spray coating of molybdenum is applied to a mutual frictional surface(B).

In accordance with the present invention as shown in FIG. 5(A), multiple grooves are formed at friction surface(A) which has been heat treated by carburizing and a spray coating of molybdenum is applied at mutual friction surface (B) so that the coefficient of friction is increased and the friction torque enhanced.

Figure 5B:
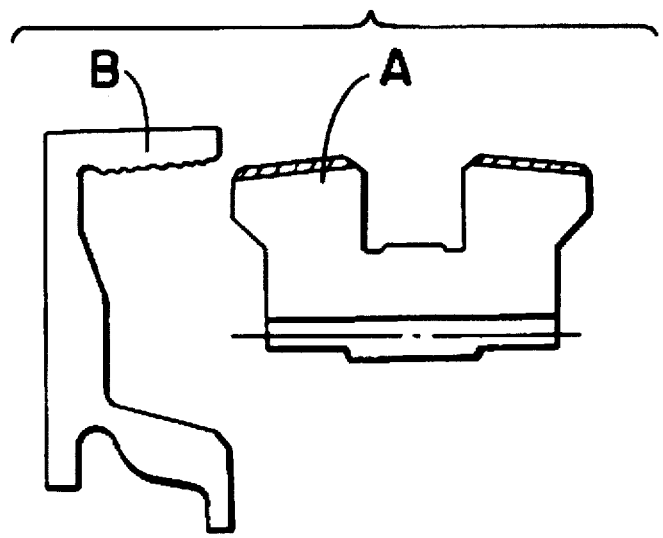
FIG. 5(B) is a longitudinal sectional drawing of another embodiment in which a spray coating of molybdenum is applied to frictional surface(A) and multiple grooves are formed at a mutual frictional surface(B).

In FIG. 5(B), a spray coating of molybdenum is applied to friction surface(A), and multiple grooves are formed at mutual friction surface(B) which has been heat treated so that the coefficient of friction is increased and frictional torque enhanced.

Figure 6:
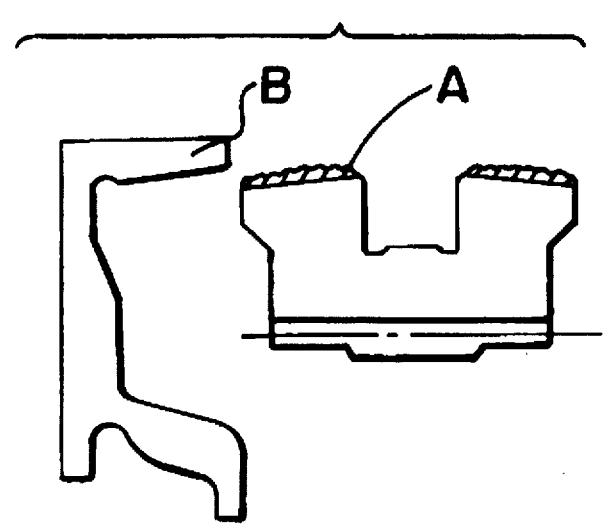
FIG. 6 is a longitudinal sectional drawing of a further embodiment having a synchronizer friction structure in which multiple grooves are formed at the surface having a spray coating of molybdenum.

In FIG. 6, a spray coating of molybdenum is applied to friction surface(A) and mutual friction surface(B), and multiple grooves are formed at friction surface (A) or mutual friction surface (B)so that the same effectiveness as the above embodiment can be obtained.

In the above aspect of the invention, a nitriding heat treatment or a heat treatment by carburizing can be applied. Applying a nitrogen heat treatment minimizes deformation to contribute to stability of formation.

Figure 7:
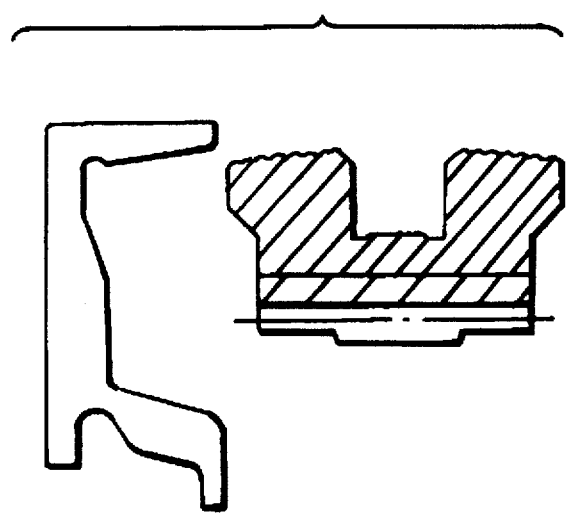
FIG. 7 is a longitudinal sectional drawing of a different embodiment having a synchronizer friction structure made of complex material.

Also, as shown in FIG. 7, for example, the sleeve can be made of copper alloy and carbon steel. In this case, a heat treatment is not applied to the copper alloy portion in which multiple grooves are formed so that its manufacture can be easy and the manufacturing cost is reduced.

In accordance with the present invention, a friction surface(A) formed at the outer circumference of the sleeve (7) and a mutual friction surface(B) formed at the inner circumference of the outer ring(2) are located at the farthest position from the center line of the main shaft so that the obtained friction torque is maximized and is the same as that as the pin type synchronizer. Also, the width of the synchronizer is small and a rapid synchronizing can be obtained so that synchronizing performance is enhanced. Furthermore, the present invention does not need an inner ring to provide a frictional force at the pin of the pin type synchronizer so that the width of the synchronizer is reduced and a compact transmission can be made.

In the present invention, the pin and the inner ring of the prior art synchronizers are not necessary and the block ring and insert key provided between the sleeve and the dog clutch of the key type synchronizer are not necessary so that the number of necessary parts is reduced and the manufacturing cost is reduced.

In accordance with the present invention, the pitch circle diameters of synchronizer hub(6), sleeve(7) and dog clutch (1) are maximum so that the width of the synchronizer is reduced and thus the time required to achieve synchronizing and the driving force are reduced remarkably whereby the enhanced performance synchronizer for an automobile transmission can be provided.

What is claimed is:

1. A synchronizer for automobile transmission comprising;

a dog clutch(1) rotatable by a mutually rotating gear on a shaft concentric with an input shaft, an outer ring inserted into the dog clutch and having a friction surface(B) formed at its inner surface, a loop spring(3) inserted between the dog clutch and the outer ring(2) and moved with the outer ring, a synchronizer hub(6) engaged with the output shaft by a spline so that they rotate at the same rotating speed and, a sleeve(7) engaged with an outer circumference of the synchronizer hub so that said sleeve rotates with the synchronizer hub at the same rotating speed and having a friction surface(A) formed at its outer circumference so that the sleeve slides during shifting wherein the frictional surface of sleeve(7) and the mutual friction surface(B) have the same sloped angle.

2. A synchronizer according to claim 1, wherein multiple grooves are formed at the friction surface(A) heat treated by carburizing and having a spray coating of molybdenum at the mutual friction surface(B) so that a friction coefficient is increased and a friction torque enhanced.

3. A synchronizer according to claim 1, wherein multiple grooves are formed at at least one of the friction surface(A) or the mutual friction surface(B) having a spray coating of molybdenum.

4. A synchronizer according to claim 1, wherein multiple grooves are formed at at least one of the friction surface(A) or the mutual friction surface(B) of a composite material heat treated by carburizing.

* * * * *